United States Patent Office 3,028,231
Patented Apr. 3, 1962

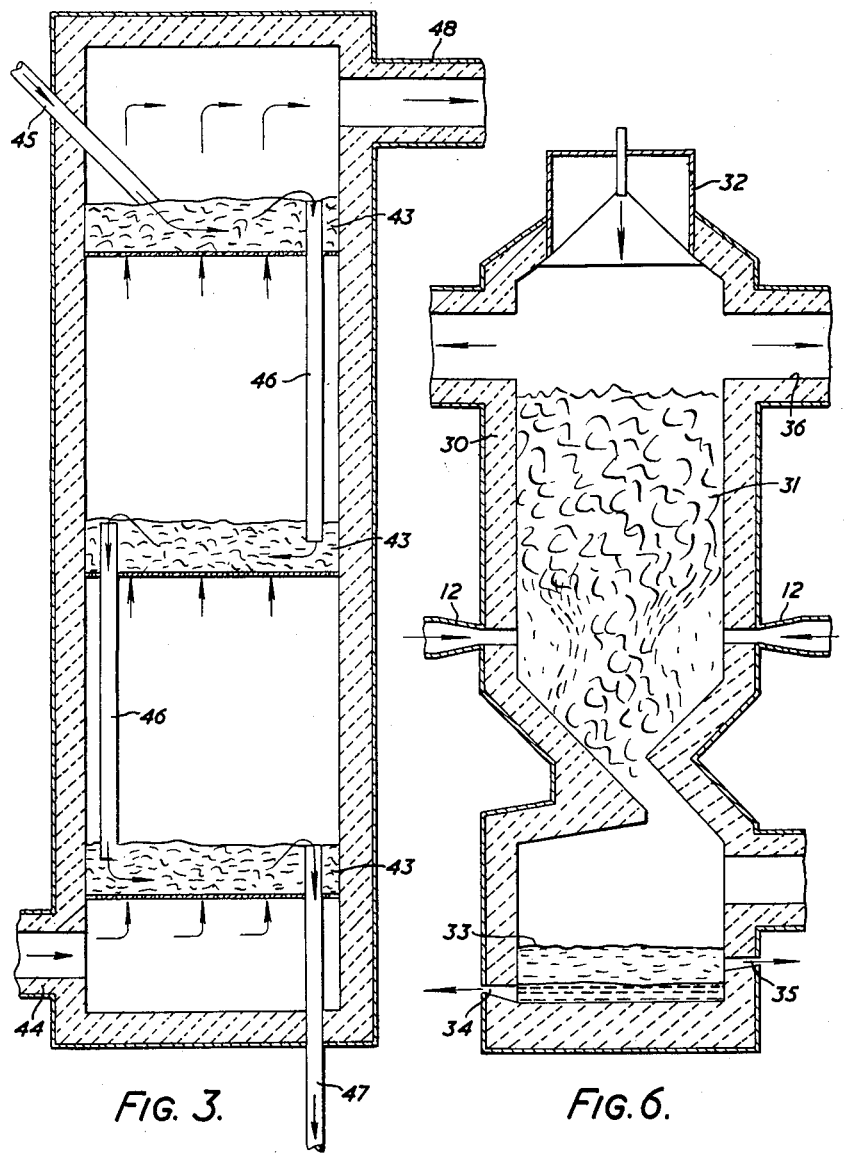

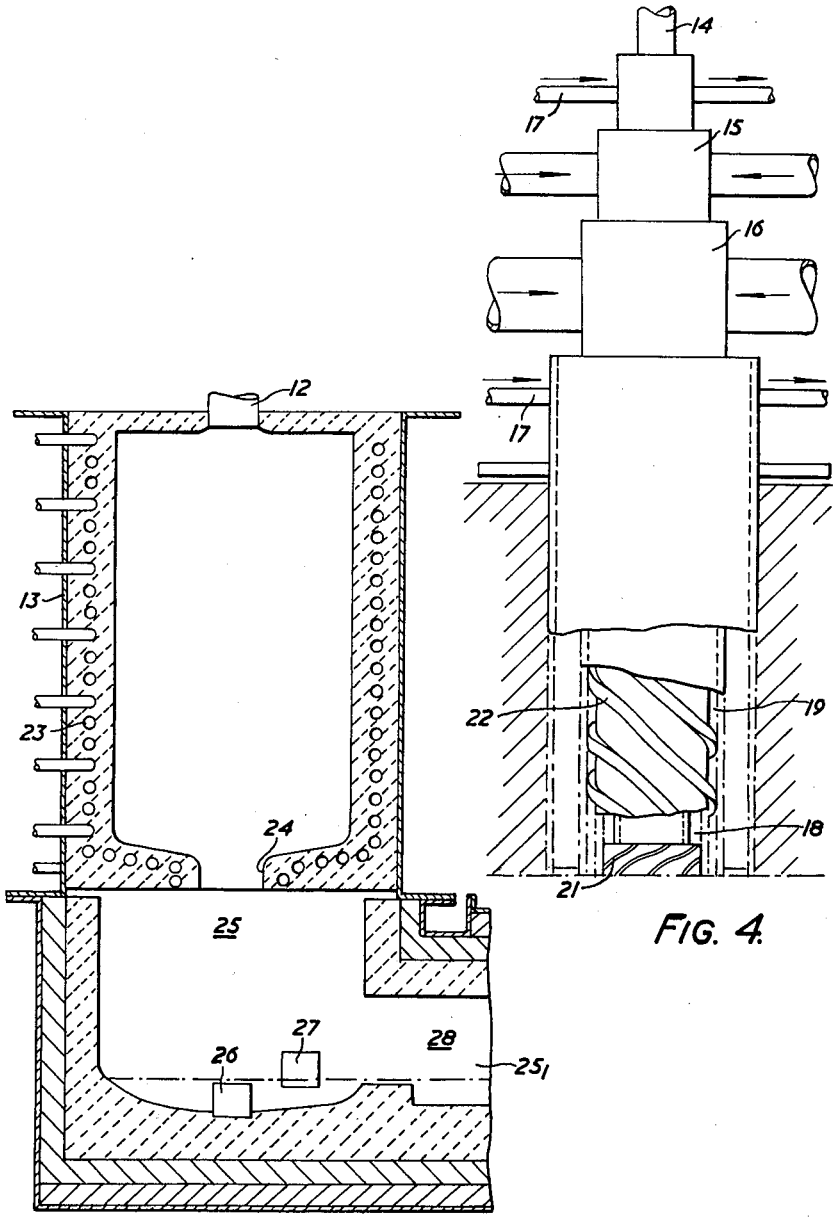

3,028,231
PROCESSING OF METALLIC ORES
Sidney Klemantaski, Forest Hill, London, Thomas William Johnson, Guisborough, and James Maurice Ridgion, Normanby, England, assignors to The British Iron and Steel Research Association, London, England
Filed Dec. 17, 1959, Ser. No. 860,218
Claims priority, application Great Britain Jan. 1, 1959
9 Claims. (Cl. 75—38)

This invention relates to the reduction of metal bearing ores and is particularly concerned with, although not limited to, the reduction of iron ores for the production of iron.

An object of the invention is to enable metal-bearing ores in a particulate and/or pulverulent state to be reduced economically and without the necessity for an initial treatment, such as briquetting or sintering, of the ores as requires to be done if such ores are to be reduced in a conventional blast furnace.

According to the present invention there is provided a process for the reduction of metal-bearing ores which comprises passing a particulate metal-bearing ore into a high temperature reactor wherein a gaseous or particulate fuel is burnt to produce a gas whose $CO/CO_2$ ratio is such that it is capable of reducing the ore to metal and to maintain the temperature in the reactor at or above the melting point of the metal, whereby liquid metal is produced.

In a preferred form of the invention the ore is partially reduced and pre-heated prior to introduction into the high temperature reactor. This may be done, and the reducing potential of the gas produced in the high temperature reactor economically utilised, by passing this gas from the high temperature reactor to a heat exchanger wherein its temperature is lowered and from the heat exchanger to a pre-reduction zone wherein the gas is contacted with fresh particulate metal-bearing ore in order to effect partial reduction of the ore and heating of the latter to an elevated temperature which is below the agglomeration temperature of the partially reduced ore, the partially reduced ore at this temperature being passed from the pre-reduction zone to the high temperature reactor to constitute the ore feed to the latter.

Figure 1:
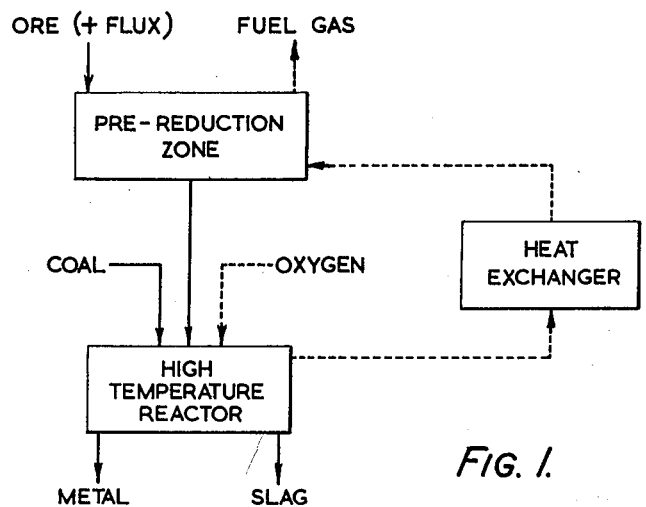

The nature of the process will be more readily understood from the flow diagram forming FIGURE 1 of the accompanying drawings. In this flow diagram, the fuel employed is finely divided coal, this being the preferred fuel for use in the process according to the invention, but other particulate or gaseous fuels, such as conventional fuel gas, may equally be employed. FIGURE 1 also illustrates the use of oxygen for combustion of the fuel, but oxygen-enriched air may also be employed. In the flow diagram full lines indicate the flow of solids (or liquids in the case of the metal and the slag) and chain lines, the flow of gas.

Referring to FIGURE 1, the ore in particulate form, together with any fluxing compounds necessary is introduced into a pre-reduction zone where it is pre-heated and partially reduced to a suitable extent by contact with a reducing gas passed into the pre-reduction zone from a heat exchanger; this gas should, of course, be at such a temperature and have such a $CO/CO_2$ ratio that the desired degree of pre-heating and partial reduction can be effected. The ore is then passed to a high temperature reactor into which finely divided coal and oxygen are also introduced under such conditions that the coal is burnt to produce a gas whose $CO/CO_2$ ratio is such that the partially reduced ore is completely reduced to metal by contact therewith and the combustion of the coal also being such that the temperature in the high temperature reactor is maintained above the melting point of the metal. Liquid metal and slag collect at the bottom of the high temperature reactor and are tapped off. The gas produced by the combustion of the coal is passed from the high temperature reactor to a heat exchanger wherein it is cooled and from which it is passed to the pre-reduction zone. After contact with the fresh ore in the pre-reduction zone, the gas will usually still have a $CO/CO_2$ ratio such that it can be used elsewhere as a fuel gas. Where the ore to be treated is an iron ore, the temperature in the high temperature reactor is preferably from 1300° to 1800° C., and advantageously 1500° C., and the temperature of the gas leaving the heat exchanger from 1000° to 700° C. depending on the extent to which the ore is to be pre-heated in the pre-reduction zone. It is preferred to pre-heat the ore to a temperature of approximately 750° C., and in this case, if the ore is at room temperature (say 20° C.) when introduced into the pre-reduction zone, the temperature of the gas leaving the heat exchanger is preferably of the order of 1050° C. The gas produced by combustion of the coal in the high temperature reactor preferably has a $CO/CO_2$ ratio of at least 5/1, and advantageously of about 10/1; after contacting the fresh ore in the pre-reduction zone, the gas preferably has a $CO/CO_2$ ratio of from 4/1 to 0, and advantageously of approximately 2/1. The extent of partial reduction of the ore passed from the pre-reduction zone to the high temperature reactor is preferably from 30% to 80%, and is advantageously approximately 60%.

The oxygen is preferably pre-heated before introduction into the high temperature reactor and this may be conveniently effected in the heat exchanger; a suitable pre-heat temperature for the oxygen is, for example, 500° C.

The heat abstracted from the hot gas in the heat exchanger may, however, be used for other purposes; thus it may be used for the generation of steam for the eventual production of oxygen. Alternatively, fresh ore may be pre-heated to the desired temperature by being passed through the heat exchanger without being contacted by the gas passing therethrough; in this case only partial reduction of the ore is effected in the pre-reduction zone because it is already pre-heated.

Figure 2:
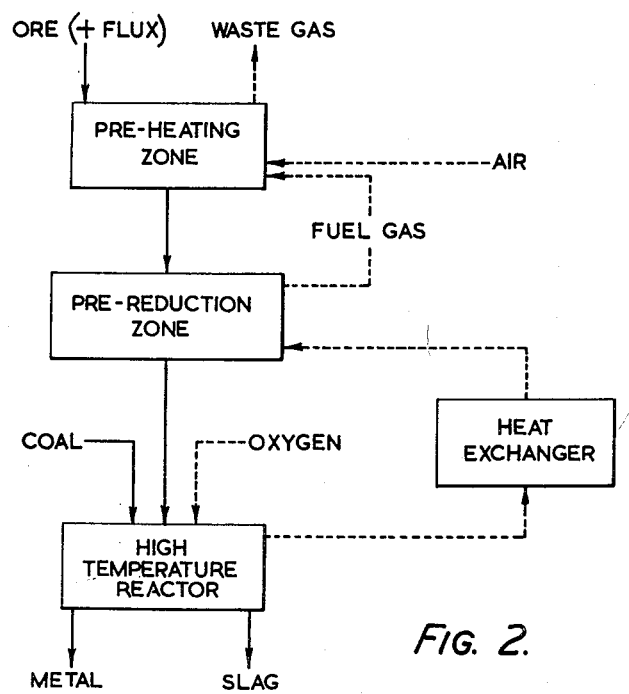

Alternative methods in which pre-heating the ore is effected prior to introduction into the pre-reduction zone and only partial reduction of the ore is effected in the latter zone are available and one such method, which is indeed preferred to pre-heating of the ore in the heat exchanger, is illustrated, by way of example only, in the flow diagram forming FIGURE 2 of the accompanying drawings.

The process illustrated in FIGURE 2 is generally similar to that shown in FIGURE 1, but in this modified process, fresh particulate ore, together with any fluxing compounds which may be necessary, are passed through a pre-heating zone before being introduced into the pre-reduction zone and gas from the pre-reduction zone (which may be a part or the whole of the gas leaving the pre-reduction zone) is passed to the pre-heating zone and burnt therein with air, oxygen or oxygen-enriched air. In this case it is, of course, essential that the gas leaving the pre-reduction zone should have a $CO/CO_2$ ratio such that it can be used as a fuel gas; ratios of from 4/1 to 2/1 are preferred.

Instead of burning gas from the pre-reduction zone in the pre-heating zone, gas from an external source may be used and the gas from the pre-reduction zone used for other purposes.

A further alternative where a pre-heating zone is employed is to separate particulate carbon from the gas leaving the high temperature reactor by the use, for example, of a cyclone, and to burn this carbon in the pre-heating zone with oxygen or oxygen-enriched air. When finely divided carbon is burnt with oxygen, as in the high temperature reactor, three reactions take place.

$$C + \tfrac{1}{2}O_2 \to CO \quad (1)$$
$$C + O_2 \to CO \quad (2)$$
$$C + CO_2 \to 2CO \quad (3)$$

The conditions of combustion in the high temperature reactor are so adjusted that the sum of these reactions is a high $CO/CO_2$ ratio in the gaseous product, but even with a high $CO/CO_2$ ratio of 10/1 or more, there is always some residual carbon. If this residual carbon is not separated from the gas leaving the high temperature reactor as described above, it may be deposited in the pre-reduction zone or may leave with the gas passing from the pre-reduction zone, in which case it can be recovered by any suitable gas cleaning system. The residual carbon is readily recycled by either of these routes and its presence is not in any way disadvantageous.

Where the ore is pre-heated before being introduced into the pre-reduction zone, the gas from the heat exchanger and the pre-heated ore are introduced into the pre-reduction zone at a temperature which is substantially that at which the partially reduced ore is passed to the high temperature reactor; as stated above this temperature is preferably about 750° C.

Instead of mixing any fluxing materials which may be required, such as lime in the case if iron-bearing ores, with the ore before the latter is introduced into the pre-reduction zone as described in connection with FIGURE 1 or before it is introduced into the pre-heating zone as described in connection with FIGURE 2, the fluxing materials may be separately pre-heated, preferably to a temperature of about 750° C., and mixed with the partially reduced ore immediately before introduction of the latter into the high temperature reactor or directly introduced into the high temperature reactor separately from the partially reduced ore.

The pre-reduction zone and, where employed, the pre-heating zone preferably include at least one fluidised bed in which the ore is maintained in a fluidised condition by the upward passage of the gas. One embodiment of a pre-reduction chamber incorporating a plurality of fluidised beds is illustrated, by way of example only in FIGURE 3 of the accompanying drawings.

Referring to this figure, the pre-reduction chamber comprises a series of fluidised beds 43 arranged in cascade. The warm reducing gas from the heat exchanger is introduced at the bottom of the chamber through an inlet pipe 44 and passes upwardly through the various beds 43. The particulate ore is introduced through a pipe 45 to the first bed 43. Subsequently it passes through connecting pipes 46 to the other fluidised beds 43 in turn. The partially reduced ore eventually leaves the chamber through a pipe 47 and is led to the high temperature reactor. The tail gas finally leaves the top of the pre-reduction chamber through an exit pipe 48.

The pre-heating chamber may take substantially the same form as the pre-reduction chamber illustrated in FIGURE 3.

Alternatively both the pre-reduction zone and the pre-heating zone may be located in different parts of the same chamber. Such a combined unit may also take substantially the same form as the pre-reduction chamber illustrated in FIGURE 3, but one or more burners or other devices for the introduction of the fuel and air, oxygen or oxygen-enriched air for the combustion thereof are provided in the side walls of the chamber, for example about half way up the chamber, so that the upper part of the chamber constitutes the pre-heating zone and the lower part, the pre-reduction zone.

In order to obtain the desired conditions in the high temperature reactor it is preferred to introduce the ore, the fuel, and oxygen or oxygen-enriched air for the combustion thereof into the reactor through one or more burners which comprise a series of concentric tubes forming a central supply passage, two annular supply passages co-axial therewith and passages for the circulation of coolant, the ore, fuel and oxygen or oxygen-enriched air each being supplied through a different passage. Advantageously one or both of the annular passages are provided with helical vanes which impart a swirling motion to the material passing through the passage(s); if both the annular passages are provided with such vanes, they are advantageously inclined in opposite senses in the two annular passages.

One embodiment of such a burner is illustrated, by way of example only, in FIGURE 4 of the accompanying drawings. The burner comprises a series of concentric tubes through which the different materials are fed into the high temperature reactor. Thus, the partially reduced ore from the pre-reduction zone is introduced through the innermost tube 14, the fuel, preferably in the form of pre-heated pulverised coal, is introduced through tube 15, and oxygen, preferably pre-heated, is supplied through tube 16. Between tubes 14 and 15 and on the exterior of the tube 16 there are passages supplied with cooling water through pipes 17. The coiling of the burner by the water passing through these passages protects it from radiated heat from the interior of the high temperature reactor. The passages 18, 19 through which the coal and the oxygen pass respectively, are provided with helical vanes 21, 22 designed to give the coal and oxygen a swirling action as it leaves the burner. As will be seen, the vanes are inclined in opposite senses in the passages so that, within the reactor, the oxygen is intimately mixed with the coal and both are intimately mixed with the ore passing down the centre of the burner.

In one actual embodiment of the burner illustrated in FIGURE 4, the angles of the vanes 21, 22 were 60° and 40° respectively and the inlet velocities of the coal and oxygen were 40 and 500 feet per second respectively.

The high temperature reactor may take a number of forms; one suitable embodiment is illustrated, by way of example only, in FIGURE 5 of the accompanying drawings. The high temperature reactor illustrated in this figure comprises a vessel 13 into which the reaction materials enter through a burner 12 which is of the type illustrated in FIGURE 4. The reactor operates on a dispersed phase principle and the vessel 13 consists of an assembly of water cooled coils, covered by a thin coating of refractory and contained in a metal shell. The vessel 13 is self-lining, slag being frozen on to the walls of the container. At the bottom, the vessel 13 leads through a neck 24, which is also water cooled, to a hearth which is shown generally at 25, metal being tapped through hole 26 and slag through hole 27. The gases from the fierce swirling reaction within the vessel 13 pass over the hearth and leave through a pipe 28 which conducts them to the heat exchanger.

Another embodiment of high temperature reactor which may be employed is substantially the same as that illustrated in FIGURE 5, but the neck 24 is omitted.

A further form of high temperature reactor is illustrated in FIGURE 6 and consists of a container 30 lined with fire brick or carbon and containing a bed 31 of solid carbonaceous material, preferably coke, which is replaced as it is used through the charging opening 32. The reaction materials—the oxygen, coal, fluxes and ore are introduced through burners 12 of the type illustrated in FIGURE 4, located in the side walls of the container 30 and the reaction takes place in the adjoining raceway area of the packed bed 31. Liquid metal and slag drip down into the hearth 33 whence they are removed through metal tap hole 34 and slag tap hole 35. The hot reducing gases from the reaction are led off to pipes 36 located at the top of the container 30 to the heat exchanger. In this case, the water cooling requirement of the vessel is very much less than that of the high temperature reactor illustrated in FIGURE 5 since the refractory of the walls is protected by the bed material 31.

In the case of iron-bearing ores, it is found that in order to produce 1 ton of metal it is, in general, necessary to use from 0.6 to 2 tons of coal and from 0.6 to 2 tons of oxygen; the amounts of coal and oxygen required depending on the quality and nature of the coal and on the design of the high temperature reactor. Concurrently with the production of 1 ton of iron, from 0.6 to 2 tons of slag are produced depending on the nature of the iron-bearing ore treated. Any suitable carrier gas may be used to convey the particulate solid materials used in the process according to the invention. Air may, for example, be employed for the purpose but its use is not preferred as it leads to dilution of the gas produced in the high temperature reactor with nitrogen and if it is used to convey the ore from the pre-reduction zone to the high temperature reactor there is a danger of re-oxidation of the ore taking place. It is, in fact, preferred to use a small proportion of the gas leaving the high temperature reactor for conveying fresh ore to the pre-reduction zone, and partially reduced ore and pulverised coal to the high temperature reactor.

Although in the foregoing description, the process according to the invention has been described with particular reference to the reduction of iron-bearing ores, it may also be used for the production of other metals, such as manganese, zinc, copper and lead, from their ores by appropriate adjustment of the temperatures and other operating conditions.

We claim:

1. A process for the reduction of iron ores which comprises the steps of introducing a partially reduced particulate iron ore, a particulate carbonaceous fuel and a gas selected from the group consisting of oxygen and oxygen-enriched air into a high temperature reactor, the said three substances being introduced into the reactor through at least one port in the form of concentrically disposed individual streams whereof one stream is axial and the other two streams are concentrically disposed with respect to said axial stream, the three streams uniting within the reactor to burn and form a combustion zone within the reactor to produce a gas having a $CO/CO_2$ ratio that is capable of reducing the partially reduced ore to metal and maintaining the temperature in the reactor at not less than the melting point of the metal whereby liquid metal is produced.

2. A process for the reduction of iron ores which comprises the steps of introducing a partially reduced particulate iron ore, a particulate carbonaceous fuel and a gas selected from the group consisting of oxygen and oxygen-enriched air into a high temperature reactor the said three substances being introduced into the reactor through at least one port in the form of concentrically disposed individual streams whereof one stream is axial and the other two streams are concentrically disposed with respect to said axial stream, the three streams uniting within the reactor to burn and form a combustion zone within the reactor to produce a gas having a $CO/CO_2$ ratio that is capable of reducing the partially reduced ore to metal and maintaining the temperature in the reactor at not less than the melting point of the metal whereby liquid metal is produced, passing the gas produced in the high temperature reactor to a heat exchanger wherein its temperature is lowered, and from the heat exchanger to a pre-reduction zone including at least one fluidized bed wherein fresh particulate metal-bearing ore is maintained in a fluidized condition by upward passage of the gas and is at least partially reduced thereby, and passing the partially reduced ore at an elevated temperature which is below the agglomeration temperature of the partially reduced ore from the pre-reduction zone to the high temperature reactor to constitute the ore feed to the latter.

3. A process as claimed in claim 2 wherein the particulate ore forms the axial stream, the particulate carbonaceous fuel forms the inner concentric stream and the gas forms the outer concentric stream.

4. A process for the reduction of iron ores which comprises the steps of passing a particulate carbonaceous fuel, a gas selected from a group consisting of oxygen and oxygen-enriched air, and a mixture of partially reduced particulate iron ore and fluxing materials into a high-temperature reactor, the said three components being introduced into the reactor through at least one port in the form of concentrically disposed individual streams whereof one stream is axial and the other two streams are concentrically disposed with respect to said axial stream, the three streams uniting within the reactor to burn and form a combustion zone within the reactor to produce a gas having a $CO/CO_2$ ratio of at least 5/1 and to maintain the temperature in the reactor at from 1300° to 1800° C. whereby liquid metal is produced from the partially reduced ore, passing the gas produced in the high temperature reactor to a heat exchanger wherein its temperature is lowered to from 1000° to 700° C., and from the heat exchanger to a pre-reduction zone wherein the gas is contacted with fresh particulate iron ore and fluxing materials in order to effect a 30% to 80% reduction of the ore and heating of the ore to an elevated temperature which is below the agglomeration temperature of the partially reduced ore, and passing the partially reduced ore and fluxing materials at this temperature from the pre-reduction zone to the high temperature reactor to constitute the ore flux feed to the latter, the gas leaving the pre-reduction zone having a $CO/CO_2$ ratio of from 4/1 to 0.

5. A process according to claim 4, wherein the oxygen-containing gas supplied to the high temperature reactor is pre-heated to a temperature of about 500° C. in the heat exchanger.

6. A process according to claim 4, wherein the high temperature reactor is at least partially filled with a bed of coke and the combustion of the fuel and reduction of the ore takes place in a raceway formed in the bed of coke.

7. A process for the reduction of iron ores which comprises the steps of passing a particulate carbonaceous fuel, a gas selected from a group consisting of oxygen and oxygen-enriched air, and a mixture of partially reduced particulate iron ore and fluxing materials into a high temperature reactor, the said three materials being introduced into the reactor through at least one port in the form of concentrically disposed individual streams whereof one stream is axial and the other two streams are concentrically disposed with respect to said axial stream, the three streams uniting within the reactor to burn and form a combustion zone within the reactor to produce a gas having a $CO/CO_2$ ratio of about 10/0 and to maintain the temperature in the reactor at from 1300° to 1800° C. whereby liquid metal is produced from the partially reduced ore, passing the gas produced in the high temperature reactor to a heat exchanger wherein its temperature is lowered to about 750° C., and from the heat exchanger to a pre-reduction zone, wherein the gas is contacted with fresh particulate iron ore and fluxing material which have been pre-heated to a temperature of about 750° C., in order to effect an about 60% reduction of the ore, and passing the partially reduced ore and fluxing materials at said temperature from the pre-reduction zone to the high temperature reactor to constitute the ore flux feed to the latter, the gas leaving the pre-reduction zone having a $CO/CO_2$ ratio of about 2/1.

8. A process according to claim 7, wherein the oxygen-containing gas supplied to the high temperature reactor is pre-heated to a temperature of about 500° C. in the heat exchanger.

9. A process according to claim 7, wherein the high temperature reactor is at least partially filled with a bed of coke and the combustion of the fuel and reduction of the ore takes place in a raceway formed in the bed of coke.

References Cited in the file of this patent

UNITED STATES PATENTS

| | | |
|---|---|---|
| 538,004 | Williamson | Apr. 23, 1895 |
| 1,815,899 | Brassert | July 28, 1931 |
| 2,182,009 | Wiberg | Dec. 5, 1939 |
| 2,750,276 | Marshall | June 12, 1956 |
| 2,824,793 | De Jahn | Feb. 25, 1958 |
| 2,864,686 | Agarwal | Dec. 16, 1958 |
| 2,915,379 | Agarwal | Dec. 1, 1959 |
| 2,919,983 | Halley | Jan. 5, 1960 |
| 2,928,730 | Luerssen | Mar. 15, 1960 |
| 2,988,443 | Metz | June 13, 1961 |